Feb. 16, 1971     W. GRUSS     3,563,621
BEARING SLEEVE ASSEMBLY
Filed Feb. 8, 1968
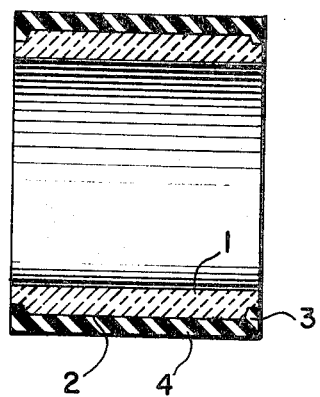
INVENTOR.
WALTER GRUSS
BY   *Kelman and Berman*
AGENTS

United States Patent Office 3,563,621
Patented Feb. 16, 1971

3,563,621
BEARING SLEEVE ASSEMBLY
Walter Gruss, Goppingen-Jebenhausen, Germany, assignor to Feldmuhle Aktiengesellschaft, Dusseldorf, Germany
Filed Feb. 8, 1968, Ser. No. 704,150
Claims priority, application Germany, Feb. 10, 1967, F 51,489
Int. Cl. F16c 27/00
U.S. Cl. 308—238                                8 Claims

ABSTRACT OF THE DISCLOSURE

A bearing sleeve assembly consisting of a tube of commercially pure, polycrystalline, sintered aluminum oxide and an axially coextensive tubular rubber layer fixedly vulcanized to the outer face of the tube which has annular recesses at both axial ends so that the axially central portion of the tube projects into the conforming rubber layer. The free inner face of the tube is ground and polished, whereas the rubber-covered outer face is relatively rough, not having received any finishing treatment after sintering.

BACKGROUND OF THE INVENTION

This invention relates to sleeve bearings, and particularly to bearing sleeves intended to be mounted either on the stationary or the moving member of a pair of movably engaged elements.

It is known that polycrystalline, sintered aluminum oxide is a very desirable material for bearing surfaces which are subject to high pressures. The sintered material is not readily attacked by aqueous solutions of acids and bases, has great hardness and compressive strength, and therefore does not wear readily even when not adequately lubricated. Bearing bushings essentially consisting of aluminum oxide maintain their desirable properties over a wide range of temperatures.

However, sintered aluminum oxide is brittle. Because of this property combined with a very high modulus of elasticity, aluminum oxide bushings cannot be press-fitted into bores of supporting elements or on journals of steel shafts. Further difficulties in handling and installing aluminum oxide bearing sleeves are caused by the sensitivity of the material to impact. Because of the great difference in thermal expansion between sintered aluminum oxide and metals, such bushings frequently cannot be used where substantial differences in operating temperature have to be expected.

The object of the invention is the provision of a bearing sleeve assembly which has all the desirable properties of a bearing face consisting of aluminum oxide, yet avoids the shortcomings of known aluminum oxide bushings enumerated above.

SUMMARY OF THE INVENTION

In one of its basic aspects, the invention resides in a bearing sleeve assembly in which a tubular member essentially consisting of polycrystalline, sintered, aluminum oxide has inner and outer axially extending faces of annular cross section about the axis of the member, and a tubular layer of elastomeric material is fixedly fastened to one of the faces and substantially covers the same. The exposed face of the tubular member is highly polished, but the covered face is preferably left in the as-sintered condition, so that the polished face is much smoother than the covered face to which the elastomeric layer is attached by vulcanizing or by an adhesive such as chloride of methylene, containing 20 percent of weight triphenylmethane-triisocyanate. A projection, for example, a broad annular rib may extend outwardly from the remainder of the covered face to improve anchorage of the elastomeric layer.

Other features, additional objects, and many of the attendant advantages of this invention will readily be appreciated as the same becomes better understood from the following detailed description of a preferred embodiment when considered in connection with the accompanying drawing.

BRIEF DESCRIPTION OF THE DRAWING

The sole figure of the drawing shows a bearing sleeve assembly of the invention in section on its axis.

DESCRIPTION OF THE PREFERRED EMBODIMENT

The illustrated bearing sleeve assembly consists of a bearing bushing 1 of high-purity, fine-grained, sintered aluminum oxide whose outer face 2 is covered by a tubular layer 4 of natural rubber. Inturned flanges 3 at the two axial ends of the rubber layer 4 conformingly engage axially open, annular grooves in the bushing 1.

The bushing consists of 97% $Al_2O_3$ and its inner cylindrical face and flat annular end faces are ground to desired dimensions and highly polished after sintering and prior to application of the rubber layer 4. The outer face 2 of the bushing 1 including the axially terminal grooves and the broad annular rib which extends outward from the central axial portion of the bushing between the grooves are not subjected to secondary shaping operations after sintering and are relatively rough. They are not normally of uniformly circular cross section about the axis of the cylindrical inner face.

The rubber layer 4 is vulcanized to the rough surfaces and adheres firmly to the same; its resistance to axial displacement on the bushing 1 is further enhanced by the differences in cross section between the several portions of the engaged rubber and aluminum oxide faces.

The rubber layer protects the aluminum oxide bushing against damage by shock or impact due to careless handling prior to assembly or during mounting on a machine part. The rubber layer greatly facilitates the installation of the bearing sleeve assembly. The yieldably resilient layer which separates the bushing 1 from the bore in a metallic machine part readily compensates for dimensional inaccuracies in the bearing sleeve assembly and in the location of the bore.

The assembly is mounted in a bore of a supporting element by a press fit, the elastomeric layer being held under compressive stress between the bushing 1 and the metallic supporting element (not shown), and retaining the bushing in its desired axial position. It is not normally necessary to attach the rubber layer to the supporting element. The viscous resilient layer 4 additionally damps vibrations which may otherwise occur in the bearing assembly. The difference in the coefficients of thermal expansion of the aluminum oxide bushing 1 and the metal of the supporting element is readily compensated for by the rubber layer if the thickness of the latter is at least one quarter of the thickness of the aluminum oxide layer, that is, if the rubber layer is not much thinner, relative to the aluminum oxide tube, than is shown in the drawing. The stresses exerted on the rigid aluminum oxide bushing 1 by the supporting element at all practical operating temperatures are negligible.

The relatively rough finish of the outer bushing surface not only improves the bond between the rubber layer and the sintered bushing, but it also significantly reduces the cost of the latter as compared to a conventional aluminum oxide bushing lapped to precise inner and outer dimensions for fit into a supporting element. For reasons not fully elucidated at this time, the bond between a vulcanized rubber layer and an aluminum oxide bushing of the type described is affected by the composition of the latter. It should contain at least 95% Al₂O₃, and preferably more. Very pure aluminum oxide also favorably affects the bond between the bushing and a rubber layer fixedly fastened to the outer bushing face over the entire area of the latter by an adhesive.

The advantages enumerated above are equally provided by a non-illustrated analogous bearing assembly of the invention in which a layer of elastomeric material is vulcanized or adhesively fastened to an inner face of an aluminum oxide bushing whereas the outer face is ground and polished for sliding engagement with a stationary machine part while the bearing sleeve assembly is mounted on a rotating shaft by a press fit.

Where natural rubber is not acceptable as a covering layer on an aluminum oxide bushing of the invention, synthetic rubber-like materials may be substituted to provide resistance to solvents, lubricants or extreme temperatures where needed.

It should be understood, therefore, that the foregoing disclosure relates only to a preferred embodiment of the invention, and that it is intended to cover all changes and modifications of the example of the invention herein chosen for the purpose of the disclosure which do not constitute departures from the scope and spirit of the invention.

What is claimed is:

1. A bearing sleeve assembly comprising, in combination:
   (a) a tubular member essentially consisting of polycrystalline, sintered aluminum oxide, containing at least 95% aluminum oxide, and having an axis and inner and outer axially extending faces of annular cross section about said axis; and
   (b) a tubular layer of elastomeric material substantially covering one of said faces and integrally vulcanized to the covered portion of said one face in such a manner that said layer is fixedly fastened to said one face.

2. An assembly as set forth in claim 1, wherein the other one of said faces is substantially smoother than said one face.

3. An assembly as set forth in claim 1, wherein the thickness of said layer is at least one quarter of the thickness of said member between said faces.

4. A bearing sleeve assembly comprising, in combination:
   (a) a tubular member consisting essentially of polycrystalline, sintered aluminum oxide, containing at least 95% aluminum oxide, and having an axis and inner and outer axially extending faces of annular cross section about said axis; and
   (b) a tubular layer of rubber fixedly fastened to one of said faces and substantially covering the same;
      (1) the other one of said faces being substantially smoother than said one face, and
      (2) the thickness of said layer being at least one quarter of the thickness of said member between said faces.

5. An assembly as set forth in claim 4, wherein respective portions of said one face covered by said tubular layer are differently spaced from said axis.

6. An assembly as set forth in claim 4, wherein said one face is formed with a projection extending outward of said tubular member from the remainder of said one face.

7. An assembly as set forth in claim 6, wherein said projection is an annular rib.

8. An assembly as set forth in claim 4, wherein said layer of elastomeric material is adhesively fastened to said covered portion of said one face.

References Cited

UNITED STATES PATENTS

| | | | |
|---|---|---|---|
| 1,963,940 | 6/1934 | Duffy | 308—26 |
| 2,223,872 | 12/1940 | McWhorter | 308—26 |
| 2,745,437 | 5/1956 | Comstock | 308—238 |
| 2,877,674 | 3/1959 | Amacost | 308—77X |
| 3,022,685 | 2/1962 | Amacost | 308—238X |
| 3,047,934 | 8/1962 | Magner | 308—238X |
| 3,049,382 | 8/1962 | Ell | 308—238X |
| 3,118,272 | 1/1964 | Clapp | 308—240 |
| 3,428,374 | 2/1960 | Orkin | 308—72 |
| 1,980,081 | 11/1934 | Ovington | 308—M |
| 2,265,065 | 12/1941 | Daywalt | 308—239X |
| 3,241,892 | 3/1966 | Olshei | 308—26 |
| 3,358,065 | 12/1967 | Enders | 308—26X |
| 3,363,300 | 1/1968 | Stec | 308—238X |
| 3,433,538 | 3/1969 | Blanding | 308—26 |

FRED C. MATTERN, Jr., Primary Examiner

W. S. RATLIFF, Jr., Assistant Examiner